United States Patent
Bratzler et al.

[15] 3,653,810
[45] Apr. 4, 1972

[54] PROCESS FOR A FINE PURIFICATION OF HYDROGEN-CONTAINING GASES

[72] Inventors: Karl Bratzler, Bad-Homburg; Alexander Doerges, Oberursel; Gerhard Hochgesand, Neu Isenburg; Gerhard Grunewald, Mainz-Mombach, all of Germany

[73] Assignee: Metallgesellschaft Aktiengesellschaft, Frankfurt (Main), Germany

[22] Filed: Sept. 8, 1970

[21] Appl. No.: 70,261

Related U.S. Application Data

[63] Continuation-in-part of Ser. No. 697,544, Dec. 12, 1967, abandoned.

[30] Foreign Application Priority Data

Dec. 16, 1966 Germany..............................M 72045

[52] U.S. Cl. ...................................................23/2 R, 55/68
[51] Int. Cl............................................................B01d 47/00
[58] Field of Search.......................23/2, 2 A, 3, 3 LA; 55/68

[56] References Cited

FOREIGN PATENTS OR APPLICATIONS 692,804  6/1953  Great Britain...............................23/3
734,577  8/1955  Great Britain...............................23/3

*Primary Examiner*—Earl C. Thomas
*Attorney*—Burgess, Dinklage & Sprung

[57] ABSTRACT

Removal of carbon dioxides from gases containing such by contacting said gases with a solution of a monoalkyl amine, a dialkyl amine, an alkanol amine or an alkylene diamine in methanol at below about 0° C. wherein said amine is present in solution in a concentration of 0.005 to 0.3 mol percent.

5 Claims, 2 Drawing Figures

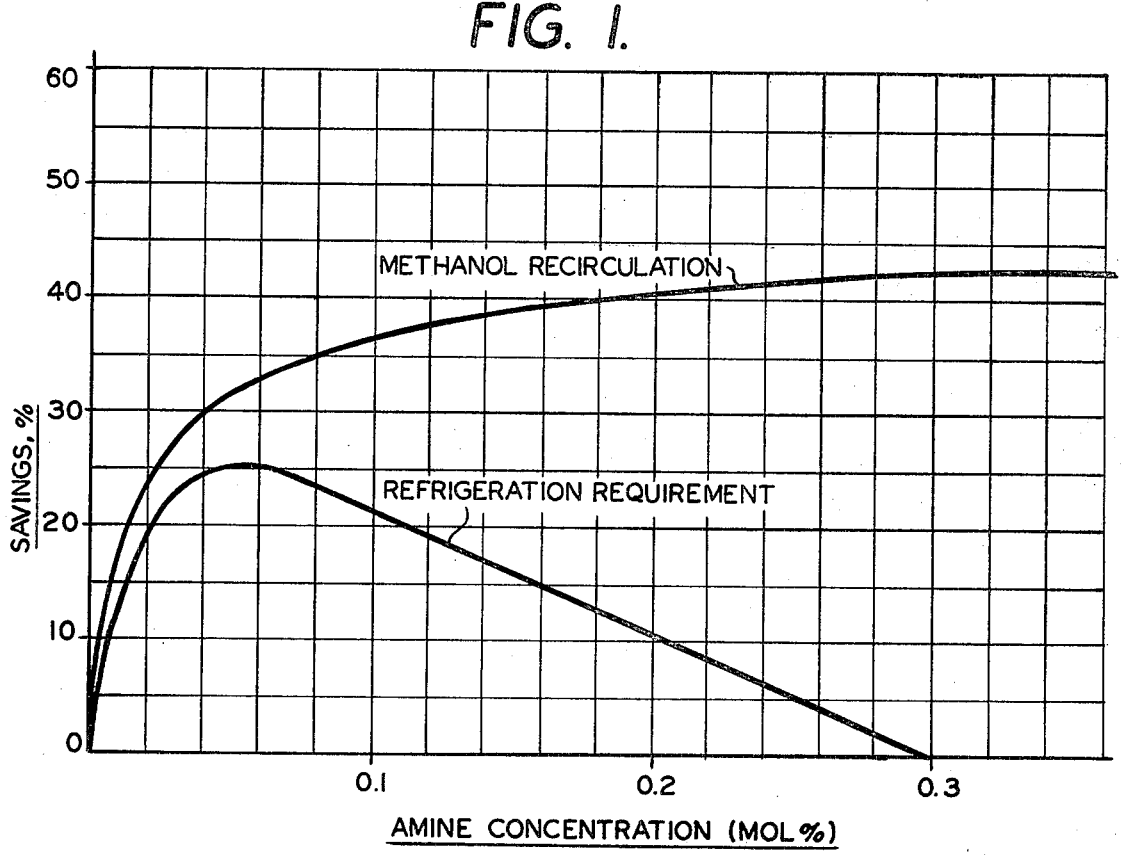
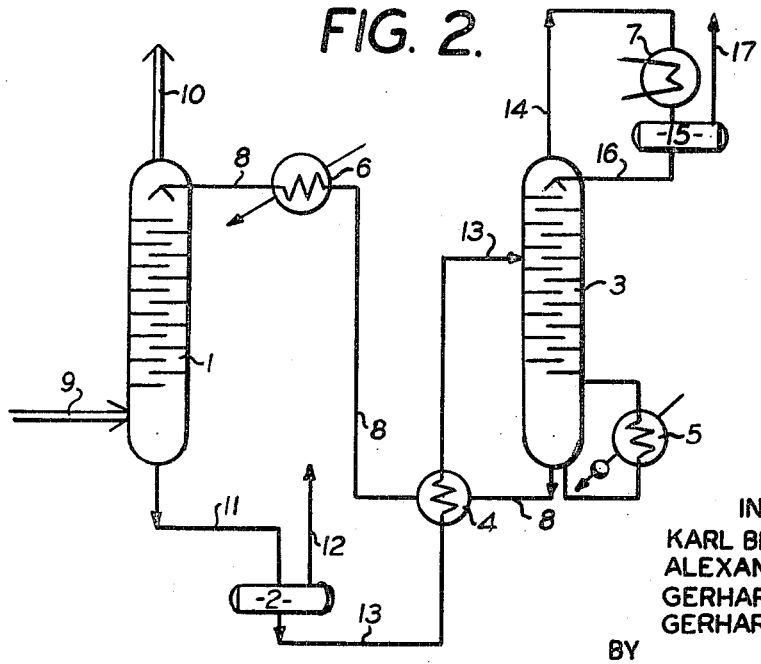
INVENTORS
KARL BRATZLER
ALEXANDER DOERGES
GERHARD HOCHGESAND
GERHARD GRÜNEWALD

PROCESS FOR A FINE PURIFICATION OF HYDROGEN-CONTAINING GASES

This application is a Continuation-in-Part of application Ser. No. 697,544, filed Dec. 12, 1967, and now abandoned.

This invention relates to a process for a fine purification of hydrogen-containing gases or of crude hydrogen by a removal of acid gas components, particularly of $CO_2$, to residual concentrations below 10 p.p.m. by scrubbing.

Hydrogen and synthesis gas for the synthesis of ammonia are produced in very large quantities by the gasification of solid fuels with steam and oxygen or air by a cracking of liquid or gaseous hydrocarbons with steam and/or oxygen or air.

When the gasification or cracking is effected with the aid of oxygen produced by the fractionation of air at low temperatures, a nitrogen-free crude gas is obtained, which consists mainly of CO and $H_2$.

When the gasification is effected with the aid of unfractionated air, the crude gas contains nitrogen in addition to CO and $H_2$.

The carbon monoxide contained in these gases is subjected to a catalytic reaction with steam to produce hydrogen and carbon dioxide. The carbon dioxide is removed from the reaction product by scrubbing so that a highly concentrated hydrogen or hydrogen-nitrogen mixture containing about 3–5 percent impurities is obtained.

To produce an ammonia synthesis gas having the correct ratio of $N_2$ to $H_2$, a mixture of technically pure oxygen and of air may be used as a gasifying or cracking agent which contains free oxygen. The composition of said gasifying or cracking agent must be calculated to meet the requirements of the gasifying or cracking process to be carried out.

When the carbon monoxide contained in the crude cracking gas has been converted into hydrogen by the so-called carbon monoxide conversion process (shift-reaction), the resulting carbon dioxide must be scrubbed from the gas which has become enriched with hydrogen.

Numerous processes are known in which acid gas components, particularly hydrogen sulfide and carbon dioxide, are removed from crude utility or synthesis gasses by scrubbing with liquid organic bases, which may be in the form of an aqueous solution, or with aqueous solutions of alkali salts of weak inorganic or organic acids. These processes are usually referred to as chemical scrubbing processes or neutralizing scrubbing processes. The absorption capacity depends on the stoichiometric laws and is independent of pressure.

For a treatment of large quantities of gases having high $CO_2$ contents, the processes referred to as physical scrubbing processes have been found satisfactory and accepted. In these processes, the acid gas components $CO_2$ and $H_2S$ together with organic sulfur compounds and resin-forming unsaturated hydrocarbons are removed by scrubbing with an organic solvent under superatmospheric pressure and, if desired, at reduced temperature. The temperatures employed in the process depend on the pressure of the crude gas and on the volatility of the solvent.

In commercial operations carried out at a rate of about 100,000 standard cubic meters per hour, it is preferred to use methanol or acetone as the absorbent at temperatures of about −40° C. and under pressure of about 20 ata. (1 ata. = 1 kg./sq.cm. absolute pressure).

A substantially complete removal of $CO_2$ to residual concentrations below 10 p.p.m. is required for a fine purification of hydrogen or mixtures of hydrogen and nitrogen and can be accomplished with he physical scrubbing processes only at the expense of large quantities for energy for regenerating the absorbent.

For this reason it is still usual in practice to remove the last traces of $CO_2$ from a previously purified gas by scrubbing with an aqueous solution of alkali hydroxide.

The spent solution is discharged from the process as an alkali carbonate solution because a regeneration thereof by causticization would be too expensive and complicated. The continuous conversion of sodium hydroxide into sodium carbonate adds considerably to the costs.

It is, therefore, an object of this invention to provide a novel method of removing carbondioxide from gases containing such.

It is another object of this invention to provide a novel method of removing residual carbon dioxide from gases.

It is a further object of this invention to provide a novel absorbent for the removal of carbon dioxide from gases containing such.

Other and additional objects of this invention will become apparent from a consideration of this entire specification, including the claims and drawing hereof.

In accord with and fulfilling these objects, one aspect of this invention resides in treatment of carbon dioxide gases at temperatures below about 0° C. with a solution of about 0.005 to 0.3 mole percent of an organic base in methanol.

It has been found that the fine purification of such compressed gases to remove small amounts of carbon dioxide, e.g., up to 3 percent per volume can be simplified and the prime and operating costs of such process can be substantially reduced if the carbon dioxide is removed by scrubbing at temperatures below 0° C., e.g., below −20° C., with methanol with a small admixture of a monoalkylamine or dialkyl amine, an alkylene diamine or an alkanolamine.

The organic base is suitably a monoalkylamine, an alkylenediamine, a dialkylamine, or an alkylolamine. It is preferred that the alkyl or alkylene group be a lower alkyl or alkylene having up to about six carbon atoms in straight or branched chain configuration. Exemplary alkyl groups (or alkylol or alkylene residues) include methyl, ethyl, propyl butyl, etc.

It is known to use solutions of strong organic bases in organic substances as an absorbent for acid gas components. These absorbents cannot be used at low temperatures because the required refrigeration would be too high owing to the heat of neutralization and because the viscosity of such mixture increases rapidly as the temperature decreases.

The use of such composite absorbents represents a departure from the physical scrubbing processes, in which the gas components to be absorbed are dissolved in rather than chemically combined with the absorbent.

Thorough investigations have shown that the concentration of the base added to the physically acting absorbent, e.g., methanol, is critical.

If the proportion of the base in the mixture is too large, the quantity of absorbent compared to the quantity of pure methanol required for a given purity of the treated gas can be considerably reduced but the heat of neutralization which is liberated results in a disproportionate increase of the refrigeration requirement.

If the proportion of the base to the methanol is too small, the absorbent recirculation rate remains almost unchanged whereas the refrigeration requirement is higher than with pure methanol.

The invention provides a process for a substantially complete removal of $CO_2$ from dry, hydrogen-containing synthesis gases by scrubbing with solutions of bases in organic solvents under increased pressure and at temperatures below 0° C.

The process according to the invention is characterized in that the absorbent consists of a solution of 0.005–0.3 mole percent of a monoalkylamine, a dialkylamine, an alkylolamine or an alkylene diamine in methanol or acetone and the laden absorbent is regenerated under atmospheric or slightly superatmospheric pressure by boiling and, if desired, by stripping with a $CO_2$-free inert gas at temperatures under 100° C.

It may be sufficient to flash the absorbent at the low scrubbing temperature and to regenerate only a partial stream by boiling and, if desired, by stripping.

The graph of FIG. 1 represents the dependence of the absorbent recirculation rate and the refrigeration requirement for a scrubbing treatment at about −40° C. on the amine content of the absorbent (methanol).

The concentration of amine in methanol in mole percent is plotted on the abscissa.

The methanol recirculation rate may be considered as a measure of the prime costs and the refrigeration requirement as a measure of the operating costs.

The savings in percent plotted on the ordinate relate to the actual absorbent recirculation rate (cubic meters per 1,000 standard cubic meters of gas) and the actual refrigeration requirement (kcal/h.) related to corresponding parameters required for removing $CO_2$ from the same gas to the same residual concentration of $CO_2$ by scrubbing with pure methanol (=100 percent).

It is apparent from this graph that the reduction of the methanol recirculation rate increases rapidly to a concentration of about 0.04 mole percent of the base and thereafter increase gradually. The reduction of the refrigeration requirement has a maximum at a concentration of about 0.05 mole percent of the base and has returned to zero at 0.3 mole percent.

Above that concentration, the refrigeration requirement is higher than where pure methanol is used. This higher refrigeration requirement is due to the increased heat of neutralization.

The transition from physical to chemical scrubbing takes place in this range.

It is apparent from the graph that in a base concentration range of 0.005–0.3 mole percent, particularly of 0.05–0.1 mole percent, in the methanol, the refrigeration requirement is reduced by about 24 percent and the methanol recirculation rate is reduced by about 32 percent.

The absorbent solution which is laden with $CO_2$, can be completely regenerated at the temperature of boiling methanol. Inexpensive heat, such as that of exhaust steam, is entirely sufficient for this purpose.

The refrigeration required for fine purification according to the invention to remove $CO_2$ may be effected with liquid nitrogen from the scrubbing process required for a removal of carbon monoxide and methane in an ammonia synthesis plant.

Alternatively, the refrigeration may be derived from a preceding low-temperature scrubbing process carried out before and/or after the conversion of carbon monoxide by the shift reaction.

Owing to the reduction of the absorbent recirculation rate and the refrigeration requirement, the use of a separate refrigerating system in the present process is quite tolerable economically, particularly if the gas is under high pressure and an absorbent temperature close to 0° C. can be selected.

For the fine purification according to the invention the crude gas should be previously purified to a residual $CO_2$ concentration of about 3 percent by volume. This results in most cases in a complete removal of sulfur and a considerable drying of the gas.

The ease of the regeneration of the amine which is dissolved in the absorbent according to the invention is due to the absence of water. It is assumed that the $CO_2$ is directly combined with the base, e.g., as a carbamate, without hydration. As the vapors of the organic solvent act as stripping vapor when the laden absorbent is being boiled, the weak bond to the $CO_2$ is destroyed so that all $CO_2$ can be driven off the absorbent.

FIG. 2 shows by way of example a flow scheme of a plant for carrying out the process according to the invention.

The plant consists of an absorption tower 1, a flashing stage 2 and a regenerating tower 3, as well as associated coolers, heat exchangers and heaters, 4, 5, 6, 7.

Compressed gas, which has been previously purified with cold methanol, is fed in a dry state through a conduit 9 to the absorption column 1, where the gas is scrubbed with cold methanol, to which 0.06 mole percent monoethanolamine have been added. The $CO_2$-free gas leaves the tower through a conduit 10. The base-containing methanol enters the absorption tower through a conduit 8 and the $CO_2$-laden methanol leaves the absorption tower through a conduit 11. Part of the dissolved gas is released in the flashing stage 2 and escapes through a conduit 12. After the flashing, the methanol is fed through a conduit 13 and the heat exchanger 4 to the regenerating column 3. The methanol is kept boiling by the reboiler 5 and is freed from $CO_2$ at the same time. The $CO_2$ which has been driven off flows together with methanol vapor through a conduit 14, the condenser 7, and a container 15.

The condensate is returned through a conduit 16 to the top of the regenerator 3. $CO_2$ is conducted through a conduit 17 to a point of use. The methanol still contained in the $CO_2$ is recovered in known manner, e.g., by scrubbing with water.

The regerated methanol which contains a base is returned to the absorber 1 through the conduit 8, the heat exchanger 4 and the cooler 6. The cooler 6 serves for compensating the refrigeration losses taking place in the process and consists of a cooling system, which may contain a refrigerator. As the absorbent is cold and is further cooled in the flashing stage 2, it is sufficient to pass a partial stream of the absorbent through the distillation column. The balance may be returned from the vessel 2 into the conduit 8 through a conduit which is not shown.

In comparison to the operation of such plant with methanol containing no amine, the use of the process according to the invention with an addition of 0.06 mole percent monoethanolamine results in a reduction by 24 percent of the refrigeration requirement in the cooler 6. This refrigeration may be supplied, e.g., by the evaporation of $NH_3$. This saving is enabled by a reduction of the methanol recirculation rate by 32 percent and by the smallest heat of reaction.

The following examples will enable a fuller understanding of the invention and were carried out with a plant as shown in FIG. 2.

EXAMPLE 1

A previously purified gas obtained by cracking natural gas and having the following composition

| | |
|---|---|
| $CO_2$ | 2.0% by volume |
| CO | 3.1% by volume |
| $H_2$ | 92.8% by volume |
| $CH_4$ | 1.1% by volume |
| $N_2$ | 1.0% by volume | enters the plant through conduit 9 at a rate of 100,000 standard cubic meters per hour. The gas is under a pressure of 24.3 ata. and at a temperature of −49° C. It is dry because it has previously been scrubbed with cold methanol. $CO_2$ is removed in the scrubbing tower 1 by scrubbing with pure methanol at −52° C., which is charged through conduit 8 at a rate of 206 cubic meters per hour. The gas which is discharged through conduit 10 contains 8 p.p.m. $CO_2$ and in a succeeding low-temperature scrubbing stage, not shown, is scrubbed with liquid nitrogen to the small residual concentrations of CO, $CO_2$ and $CH_4$ permissible for the synthesis of ammonia.

The methanol draining from the scrubbing tower 1 has a temperature of −48° C. and is flashed to 3 ata. in the flashing vessel 2. The flashed-off gas is discharged through a conduit 12. It contains $CO_2$, hydrogen, CO, $CH_4$ and $N_2$ and may be recompressed and returned into the crude gas or may be used as fuel gas. The methanol draining from the flashing vessel 2 is fed by a pump (not shown) through the heat exchanger 4, where it is heated to +75° C. by the regenerated methanol, which is still hot. At this temperature, most of the $CO_2$ is flashed when the methanol at this temperature enters the regenerating column, which is under a pressure of 2 ata. The flashed-off $CO_2$ is discharged through a conduit 14. The residual $CO_2$ which is in solution in the methanol is driven off in that the methanol is heated to the boiling temperature at the bottom of the regenerating column by means of the reboiler 5. The methanol draining through conduit 8 has a temperature of +85° C. and is free of $CO_2$. It is fed through the heat exchanger 4 by a pump (not shown) and has thereafter a temperature of −44° C. At this temperature, it enters the cooler 6, where it is cooled to −52° C., e.g., with cold methanol from the preliminary scrubbing stage, in which the bulk of the $CO_2$ is removed.

The refrigeration to be supplied in the cooler 6 amounts to 680,000 kcal/h. The cooled methanol is returned to the scrubbing tower 1.

EXAMPLE 2

$CO_2$ is to be removed in the scrubbing tower 1 from the same gas as in Example 1. The methanol used as a scrubbing agent contains now about 0.063 mole percent monoethanolamine. This reduces the required methanol recirculation rate to 141 cubic meters per hour, which is 31 percent less than in Example 1. On the other hand, a heat of reaction of 45,000 kcal/h. is liberated in the scrubbing tower as a result of the reaction of the ethanolamine with 2.5 percent of the total amount of 2,000 standard cubic meters $CO_2$ to be removed per hour. This heat of reaction increases the temperature of the draining methanol by 0.8° C. As a result, part of the refrigeration required in the heat exchanger 4 cannot be transferred and the regenerated methanol is precooled in the heat exchanger 4 only to −43.2° C. Refrigeration amounting to only 510,000 kcal/h. is required in the cooler 6, which is 25 percent less than in Example 1, whereas the evaporation heat requirement is increased by 45,000 kcal/h. because the heat of dissociation must now be generated in the reboiler 1. This heat may be supplied in the form of inexpensive water heat. There is thus a considerable reduction of the investment and operating costs compared to Example 1.

EXAMPLE 3

The same gas as in Example 1 is scrubbed in the scrubbing tower 1 with methanol, which contains 5 mole percent monoethanolamine. Methanol is required at a rate of 104 cubic meters per hour, which is almost 50 percent less than in Example 1. As a result, 1,450 standard cubic meters $CO_2$ are chemically combined and 550 standard cubic meters $CO_2$ are physically dissolved per hour. The heat of reaction liberated in the scrubbing tower amounts to 11,310,000 kcal/h. so that the temperature of the draining methanol is increased to −20.3° C. and the refrigeration requirement in the cooler 6 is 1,650,000 kcal/h., which is 143 percent more than in Example 1, where no ethanolamine was added. Thus, the investments costs are reduced but the operating costs are much increased because the optimum admixture of ethanolamine has been much exceeded.

EXAMPLE 4

The same gas as in example is scrubbed in the scrubbing tower 1 with methanol which containg 0.032 mol percent ethylene diamine. Methanol is required at a rate of 141 cubic meters per hour which is 31 percent less than in Example 1. As a result 50 standard cubic meters of $CO_2$ were chemically combined and 1,950 standard cubic meters of $CO_2$ were physically dissolved per hour. The heat of reaction liberated in the scrubbing tower amounts to 48,000 kcal/h. so that the temperature of the draining methanol was increased to −47.1° C. and the refrigeration requirement in the cooler 6 was 512,000 kcal/h., which was 25 percent less than in Example 1 where no amine was added, but the amount of circulated methanol was higher.

EXAMPLE 5

The same gas as in Example 1 is scrubbed in the scrubbing tower 1 with methanol which contains 0.032 mol percent propylenediamine. Methanol is required at the rate of 141 cubic meters per hour which is 31 percent less than in Example 1. As a result 50 standard cubic meters of $CO_2$ were chemically combined and 1,950 standard cubic meters of $CO_2$ were physically dissolved per hour. The heat of reaction liberated in the scrubbing tower amounts to 46,000 kcal/h. so that the temperature of the draining methanol was increased to −47.2° C. and the refrigeration requirement in the cooler 6 was 51,000 kcal/h., which was 25 percent less in Example 1 where no amine was added.

Organic polar scrubbing agents other than methanol may be used, particularly alcohols, ketones, esters or ethers, provided that their boiling point at atmospheric pressure is below 100°° C. An example of such alternative scrubbing agent is ethanol.

The gases from which $CO_2$ is to be removed should be dry because otherwise water would have to be removed from the scrubbing agent cycle and such water would contain amine or amino alcohol so that losses would be incurred. Besides, an enriching of water in the absorbent would have a very adverse effect on the heat balance.

We claim:

1. Process of substantially completely removing carbon dioxide from gases which have a low carbon dioxide content of up to about 3 volume percent and have been previously dried, which process comprises scrubbing said gases, at less than about 0° C. with a solution of about 0.005 to 0.3 mol percent of a monoalkylamine, a dialkylamine, an alkylolamine or an alkylene diamine having up to about six carbon atoms in straight or branched chain configuration in any alkyl or alkylene group thereof, in methanol; and regenerating said carbon dioxide-containing scrubbing solution by flashing such and then by heating at least part of the flashed scrubbing solution to about 100° C. at about 1 to 2 kg./cm.$_2$ absolute pressure.

2. Process as claimed in claim 1 wherein said base is diethanolamine.

3. Process as claimed in claim 1 wherein said base is ethylene diamine.

4. Process as claimed in claim 1 wherein said base is monoethanolamine.

5. Process as claimed in claim 1 including stripping said flashed solution with a carbon dioxide free gas.

* * * * *